(12) United States Patent
Yamazumi et al.

(10) Patent No.: US 8,721,982 B2
(45) Date of Patent: May 13, 2014

(54) REACTION DEVICE

(75) Inventors: Shigemasa Yamazumi, Tokyo (JP);
Masahiro Yonekura, Tokyo (JP);
Hidetoshi Oota, Tokyo (JP)

(73) Assignee: Taiyo Nippon Sanso Corporation, Tokyo (JP)

(*) Notice: Subject to any disclaimer, the term of this patent is extended or adjusted under 35 U.S.C. 154(b) by 91 days.

(21) Appl. No.: 13/388,107

(22) PCT Filed: Aug. 3, 2010

(86) PCT No.: PCT/JP2010/063076
§ 371 (c)(1),
(2), (4) Date: Jan. 31, 2012

(87) PCT Pub. No.: WO2011/016443
PCT Pub. Date: Feb. 10, 2011

(65) Prior Publication Data
US 2012/0128545 A1    May 24, 2012

(30) Foreign Application Priority Data
Aug. 4, 2009 (JP) .................. 2009-181175

(51) Int. Cl.
*F28D 21/00* (2006.01)
*B01J 19/00* (2006.01)
*F28F 3/12* (2006.01)

(52) U.S. Cl.
USPC ........... 422/202; 422/129; 422/131; 422/138; 422/198; 165/168; 165/169

(58) Field of Classification Search
USPC .......... 422/129, 131, 138, 198, 202; 165/168, 165/169
See application file for complete search history.

(56) References Cited

U.S. PATENT DOCUMENTS 1,003,243 A * 9/1911 Ellis, Amos .................. 422/163
1,841,762 A * 1/1932 Samesreuther et al. ...... 165/169
(Continued)

FOREIGN PATENT DOCUMENTS

CN    201138106 Y    10/2008
JP    63-44085 U    3/1988
(Continued)

OTHER PUBLICATIONS

International Search Report dated Sep. 14, 2010, issued for PCT/JP2010/063076.

(Continued)

*Primary Examiner* — Natasha Young
(74) *Attorney, Agent, or Firm* — Edwards Wildman Palmer LLP; James E. Armstrong, IV; George N. Chaclas

(57) ABSTRACT

A reaction device having improved temperature control precision and reduced usage of heat transfer medium. The device includes a heat transfer medium circulation tube in contact with an outer wall of a reaction vessel containing a reaction liquid. The device has an inlet for the liquid heat transfer medium at the lower end portion of the heat transfer medium circulation tube, and an outlet for the heat transfer medium. Gaps between the heat transfer medium circulation tube and the reaction vessel outer wall include a filler in which a liquid can flow inside the filler. The outlet is formed so that the liquid heat transfer medium is discharged toward the filler. A member presses the heat transfer medium circulation tube against the outer wall of the reaction vessel. An outer vessel hermetically covers the outer circumference of the reaction vessel.

19 Claims, 9 Drawing Sheets

(56) References Cited

U.S. PATENT DOCUMENTS

| | | | |
|---|---|---|---|
| 4,739,630 A | * | 4/1988 | Tandeski et al. ........... 62/354 |
| 5,667,758 A | * | 9/1997 | Matsugi et al. ............ 422/198 |

FOREIGN PATENT DOCUMENTS

| | | | |
|---|---|---|---|
| JP | 07-163892 | A | 6/1995 |
| JP | 09-229574 | A | 9/1997 |
| JP | 2002-066720 | A | 3/2002 |
| JP | 2006-258315 | A | 9/2006 |
| JP | 2006-271431 | A | 10/2006 |
| JP | 2006-308185 | A | 11/2006 |
| JP | 2008-96062 | | 4/2008 |
| JP | 2008-151381 | A | 7/2008 |

OTHER PUBLICATIONS

First Office Action dated Sep. 18, 2012 prepared in Japanese patent application No. JP 2011-525891.

Second Office Action dated Jan. 8, 2013 prepared in Japanese patent application No. JP 2011-525891.

First Office Action dated Feb. 16, 2013 prepared in Chinese patent application No. CN 201080034361.8.

* cited by examiner

REACTION DEVICE

TECHNICAL FIELD

The present invention relates to a reaction device in which a reaction liquid contained in a reaction vessel is cooled or heated by a heat transfer medium to be reacted.

BACKGROUND ART

In a chemical reaction process such as organic synthesis or crystallization, a reaction liquid is required to be retained at a prescribed temperature. Therefore, a double structure jacket type container is used in which a jacket is provided on the outer side of a reaction vessel and a heat transfer medium can be circulated between the jacket and the reaction vessel. A heat transfer medium having a prescribed temperature is provided in the jacket, and the reaction liquid in the reaction vessel has been adjusted at a prescribed temperature (see, for example, Patent Document 1).

PRIOR ART DOCUMENT

Patent Document

Patent Document 1: JP 2006-271431 A

SUMMARY OF THE INVENTION

Problem which the Invention Tries to Solve

When the temperature of a reaction liquid is retained at a temperature higher than room temperature, a sufficient temperature control precision can be obtained since a heat transfer medium temperature can relatively easily be adjusted by heating the heat transfer medium by a heater or the like. On the other hand, since, generally, liquid nitrogen having a temperature of $-196°$ C. is used for a cooling source in a low temperature region, in particular, in an ultra low temperature region of $-90°$ C. or lower, and thus, the temperature difference between the heat transfer medium temperature and a controlled temperature is large, there has been a problem in the temperature control precision.

In cases where an initial cooling is performed by providing liquid nitrogen in a jacket, since a massive amount of liquid nitrogen is left in a jacket even when the provision of liquid nitrogen is stopped at the time when a reaction liquid in a reaction vessel is cooled to a set temperature, and the cooling proceeds until the left liquid nitrogen is vaporized, there has also been a problem that an undershoot occurs with respect to the set temperature. Further, there is a lot of liquid nitrogen which does not contribute to the heat exchange with the reaction vessel and is vaporized and discharged from the inside of the jacket. In particular, the amount of liquid nitrogen used at the initial cooling has been large.

Accordingly, an object of the present invention is to provide a reaction device having a simple structure in which a temperature control precision can be improved, and at the same time, the amount of heat transfer medium used can be reduced.

Means for Solving the Problems

In order to attain the above-mentioned object, the reaction device of the present invention is provided with a heat transfer medium circulation tube in contact with an outer wall of a reaction vessel containing a reaction liquid, and at the same time, is provided with an inlet for the liquid heat transfer medium at the lower end portion of the heat transfer medium circulation tube, and an outlet for the liquid heat transfer medium or a gas heat transfer medium which is a vaporized liquid heat transfer medium at the upper end portion of the heat transfer medium circulation tube, respectively.

Further, preferably, the heat transfer medium circulation tube is wound spirally from the bottom side of the reaction vessel to the top side the of reaction vessel. Gaps between the heat transfer medium circulation tube and the reaction vessel outer wall are filled with a filler, and in particular, the filler is formed by a material in which a liquid can flow inside the filler, and at the same time, the outlet is formed in a direction such that the liquid heat transfer medium is discharged toward the filler. Further, a pressing member for pressing the heat transfer medium circulation tube against the outer wall of the reaction vessel is provided on the outer circumference of the heat transfer medium circulation tube; an outer vessel is provided which hermetically covers the outer circumference of the reaction vessel provided with the heat transfer medium circulation tube; and the heat transfer medium is liquid nitrogen.

The reaction device of the present invention is provided with a heat transfer medium circulation tube, via a filler inside which a liquid can flow, on an outer wall of a reaction vessel containing a reaction liquid, and at the same time, is provided with an inlet for the liquid heat transfer medium at the lower end portion of the heat transfer medium circulation tube, and an outlet for the liquid heat transfer medium or a gas heat transfer medium which is a vaporized liquid heat transfer medium at the upper end portion of the heat transfer medium circulation tube, respectively.

Effects of the Invention

By the reaction device of the present invention, the amount of heat transfer medium introduced in a heat transfer medium circulation tube can be made small compared with a conventional one having a jacket structure, and a reaction vessel can be efficiently cooled or heated by a small amount of heat transfer medium, and at the same time, temperature control precision can be improved. In particular, the occurrence of undershoot at the time of cooling to an ultra low temperature by using liquid nitrogen as a heat transfer medium can be prevented.

MODES FOR CARRYING OUT THE INVENTION

Figure 1:
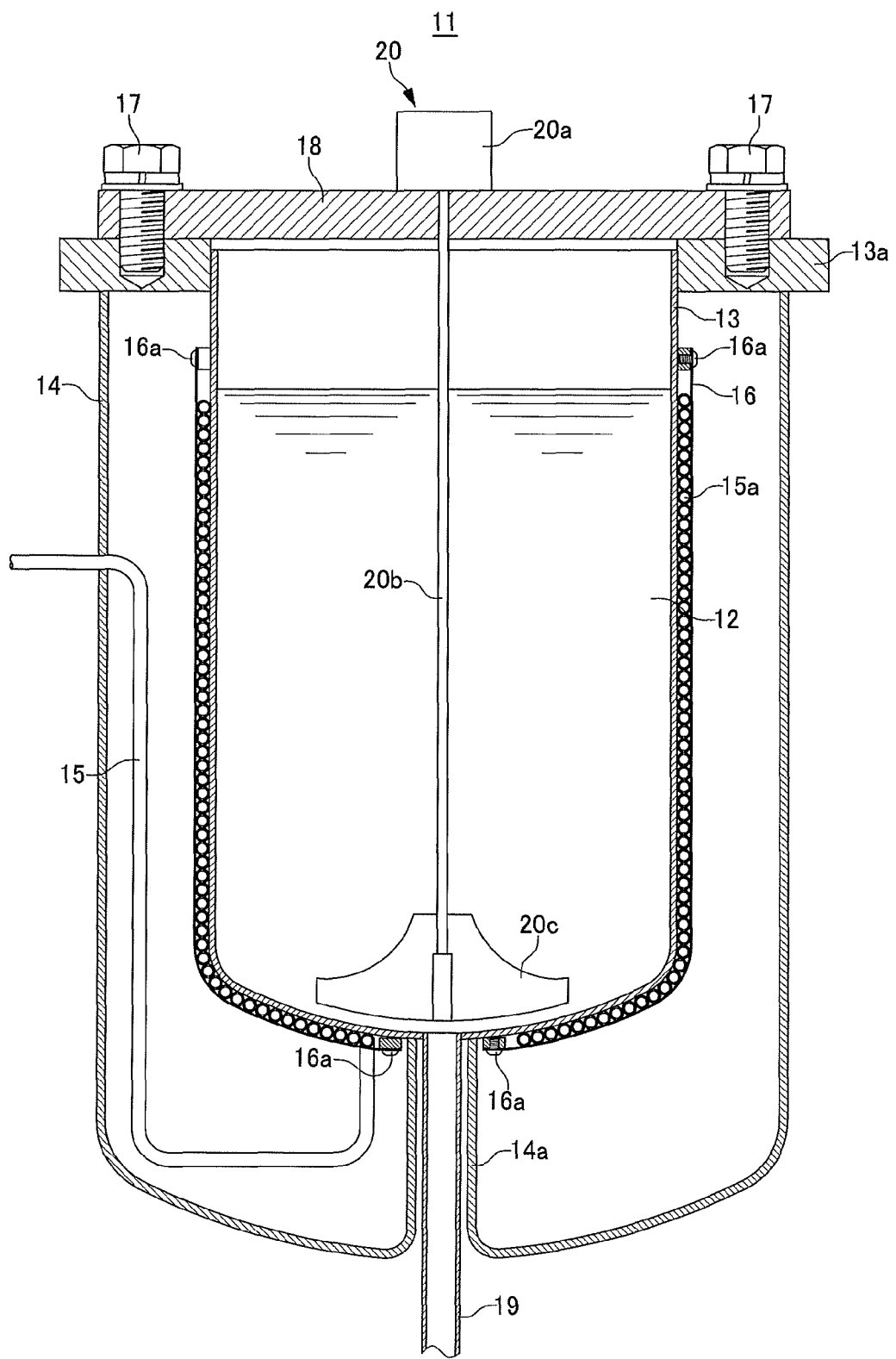
FIG. 1 is a sectional front view of a reaction device representing the first embodiment of the present invention.
Figure 2:
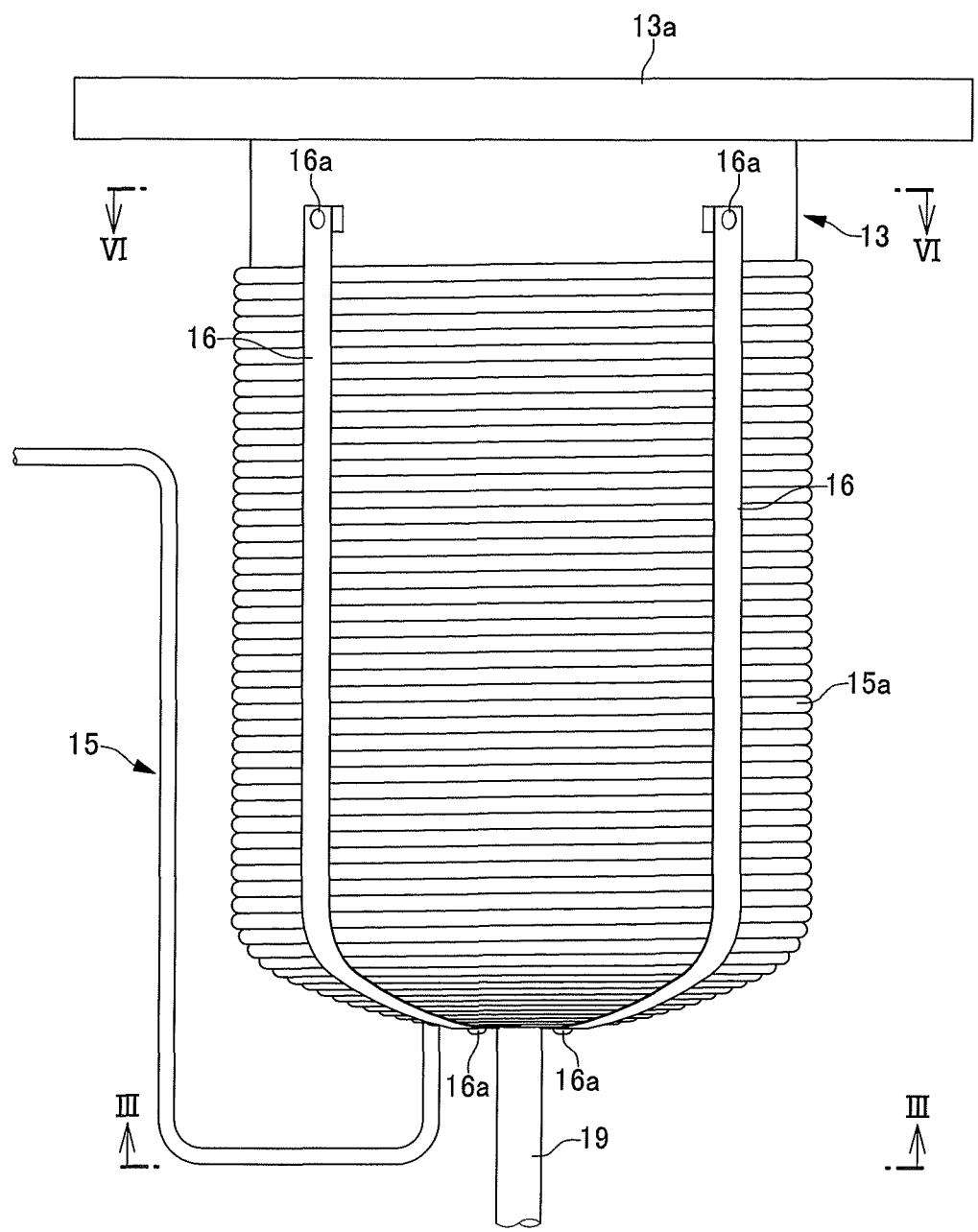
FIG. 2 is a front view of a reaction vessel of the same.
Figure 3:
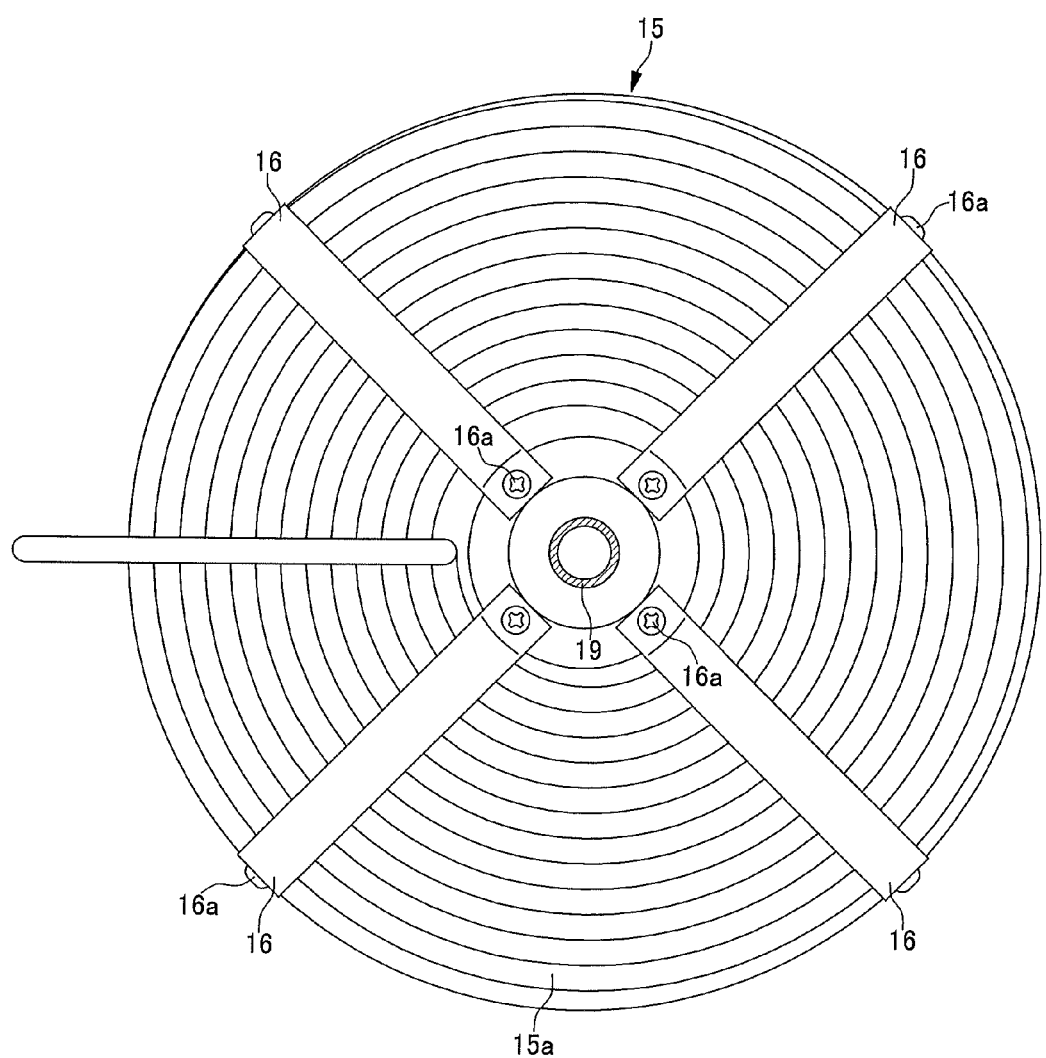
FIG. 3 is a III-III sectional view of FIG. 2.
Figure 4:
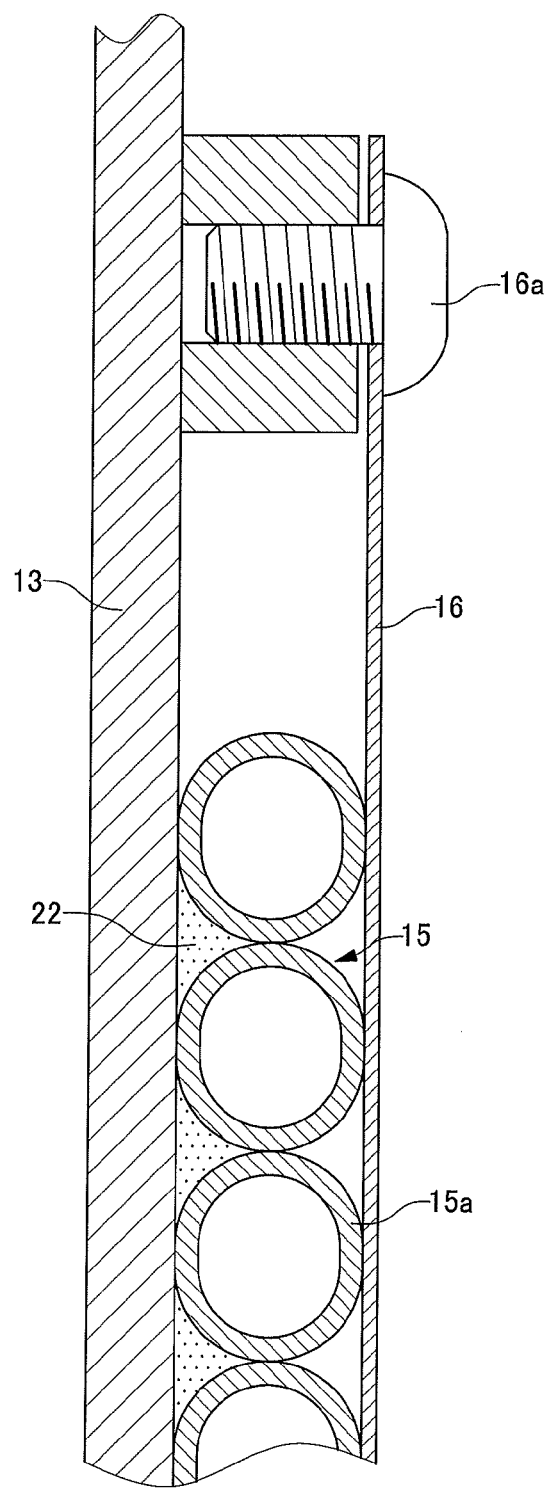
FIG. 4 is a cross-sectional view representing the attachment state in the upper portion of a pressing plate of the same.
Figure 5:
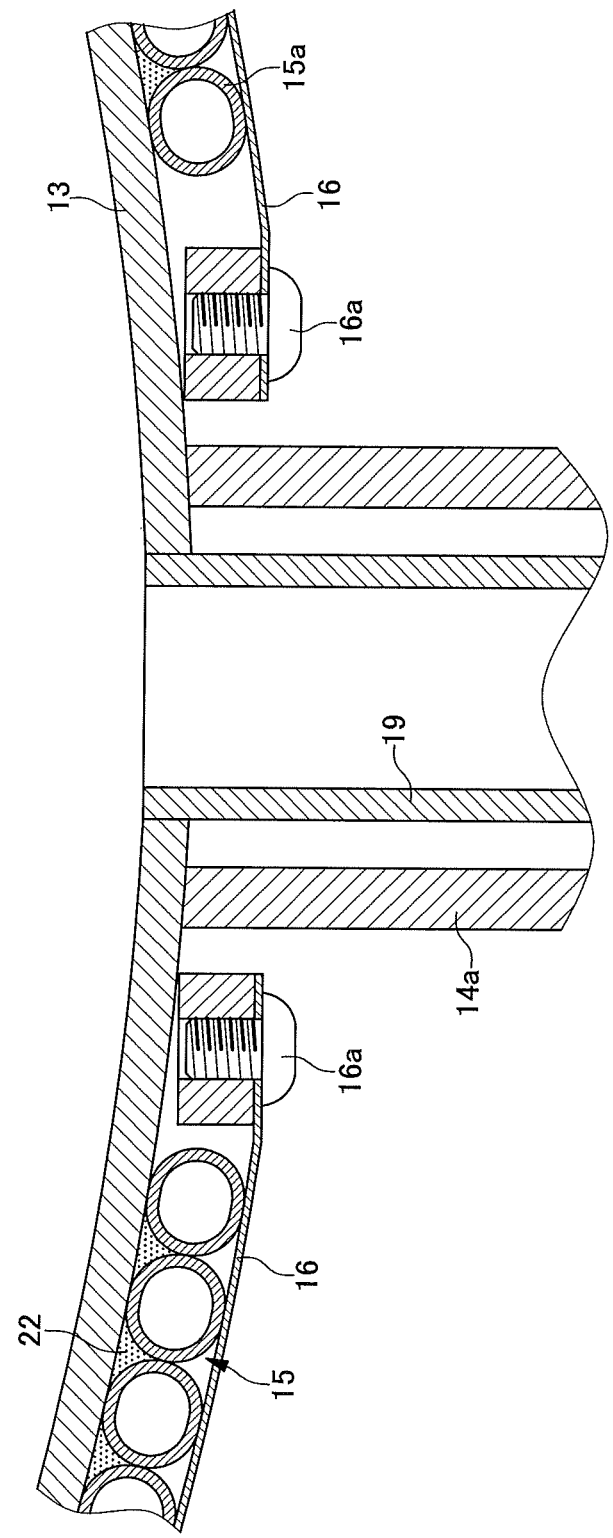
FIG. 5 is a cross-sectional view representing the attachment state in the lower portion of a pressing plate of the same.
Figure 6:
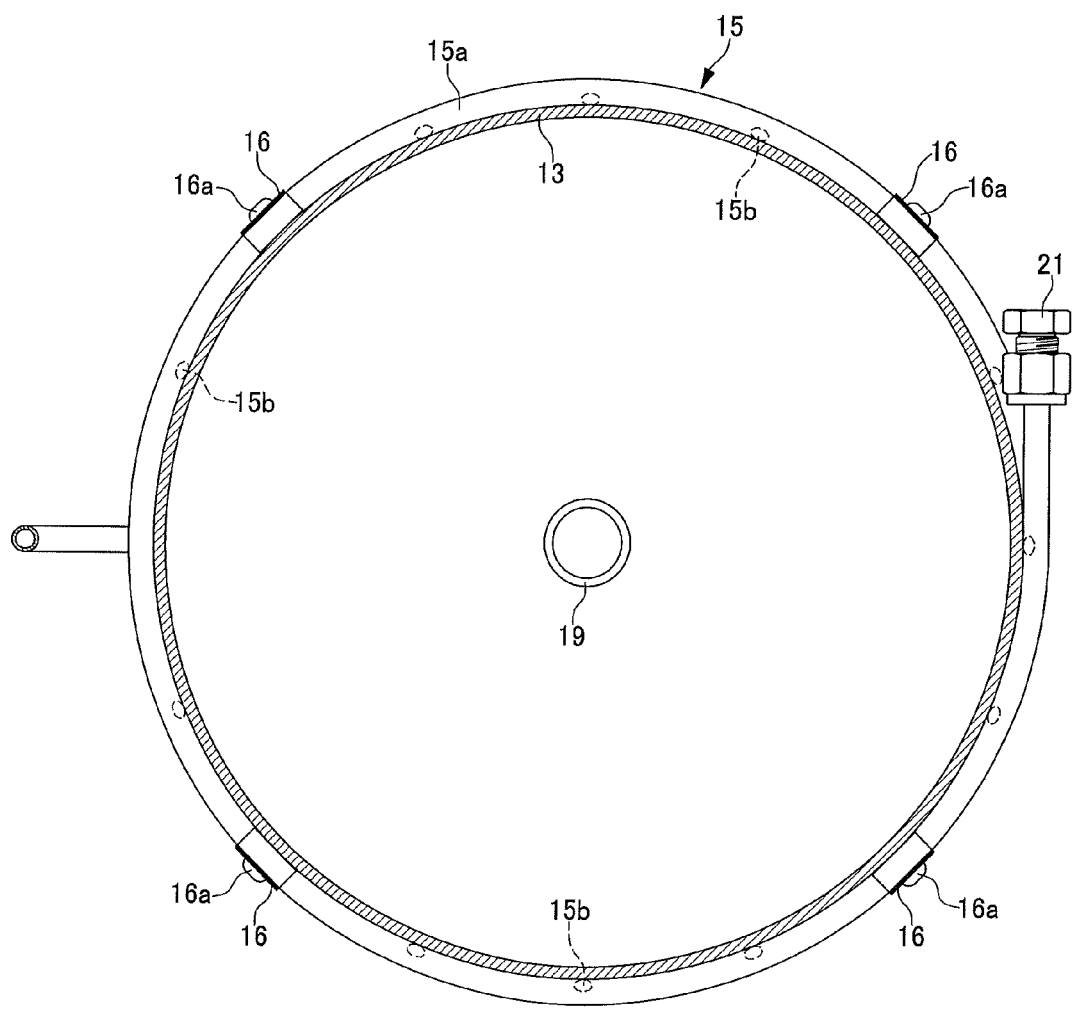
FIG. 6 is a VI-VI sectional view of FIG. 2.
Figure 7:
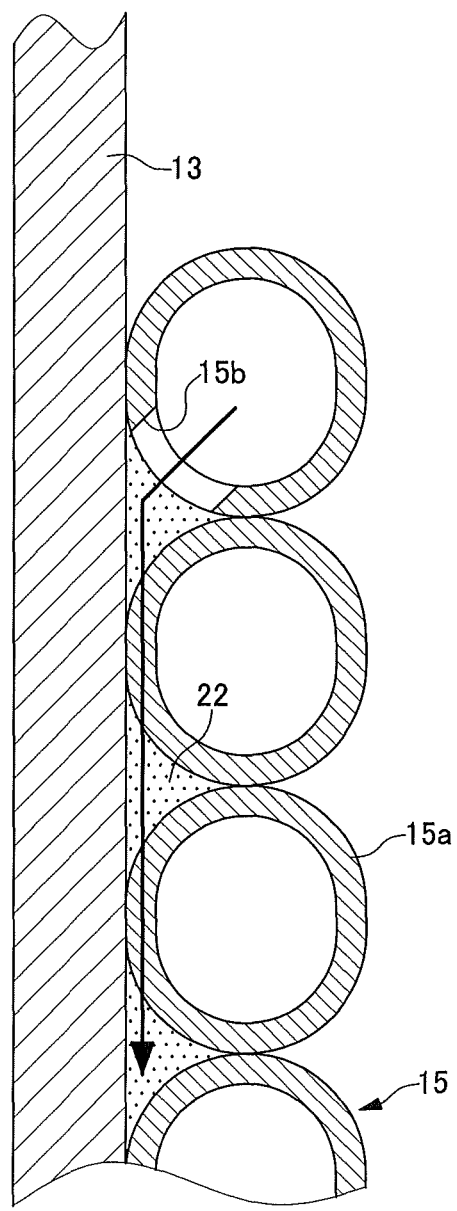
FIG. 7 is a cross-sectional view of the main portion of the same.

In the first embodiment of the reaction device of the present invention shown in FIGS. 1 to 7, this reaction device 11 is such that an outer vessel 14 is provided on the outer side of a reaction vessel 13 containing a reaction liquid 12, and on the outer wall of the reaction vessel 13, one heat transfer medium circulation tube 15 which circulates a heat transfer medium such as liquid nitrogen is wound spirally from the bottom side toward the top side of the reaction vessel 13, and is pressed against the outer wall of the reaction vessel 13 by a pressing member 16.

The reaction vessel 13 is a bottomed cylindrical container having an opening on the top made of a metal such as a stainless steel, wherein a reaction vessel flange 13a is provided on the outer circumference on the upper portion of the reaction vessel 13, and the top opening of the reaction vessel 13 is covered by a lid member 18 fixed detachably on a reaction vessel flange 13a with a bolt 17. A discharge tube 19 protrudes from the center on the bottom of the reaction vessel 13 toward the bottom of the outer vessel 14.

An outer vessel 14 is a bottomed cylindrical container with a size such that the reaction vessel 13 can be contained, which is made of a metal such as a stainless steel, wherein a cylindrical portion 14a through which the discharge tube 19 penetrates is provided at the center of the bottom thereof. The lid member 18 is provided with an agitator 20 having an agitation blade 20c at the tip of a rotation axis 20b to which a motor 20a is connected, and at the same time, is provided with a temperature sensor insertion portion, an agent injection portion or the like as appropriate, each of which is not shown.

A heat transfer medium circulation tube 15 passes through the space portion between the reaction vessel 13 and the outer vessel 14, extends below the bottom of the reaction vessel 13, then rises up toward the center side of the bottom of the reaction vessel 13, and is spirally wound from the bottom side to the top side of the reaction vessel 13 to form a wound portion 15a. The terminal of the heat transfer medium circulation tube 15 is equipped with a cap 21 which occludes the opening end of the heat transfer medium circulation tube 15, and at the same time, one round portion which is wound at the uppermost portion is provided with a plurality of orifices 15b which discharge liquid nitrogen or a low temperature nitrogen gas which is the vaporized liquid nitrogen which has risen up in the heat transfer medium circulation tube 15, from inside the heat transfer medium circulation tube 15, toward the outer wall of the reaction vessel 13.

This orifice 15b is such that liquid nitrogen is discharged therefrom toward the outer wall of the reaction vessel 13 directing diagonally below with respect to the horizontal direction, for example, in an angle of about 45 degrees diagonally below with respect to the horizontal direction. Sixteen orifices 15b are provided in the circumferential direction of the reaction vessel 13 at regular intervals. By providing such an orifice 15b, liquid nitrogen which is provided in the heat transfer medium circulation tube 15 and which is discharged from the orifice 15b can be allowed to flow along the outer wall of the reaction vessel 13, and direct heat exchange between the flowing liquid nitrogen and the outer wall of the reaction vessel 13 is performed to efficiently cool the reaction vessel 13. Although a plurality of the orifices 15b are provided only on one round of the heat transfer medium circulation tube 15 which is wound at the uppermost portion in FIG. 7, it is also possible to produce a device having a configuration in which the orifices 15b are provided at the top third in the height direction of the reaction vessel 13, and preferably at the top three rounds at the uppermost portion.

The heat transfer medium circulation tube 15 may be formed of copper, stainless steel or the like, and the shape of the heat transfer medium circulation tube 15 may be any shape such as an oblong circular, circular or elliptical cross-sectional shape. By employing an oblong circular cross-sectional shape, the contact area with the reaction vessel 13 is increased and the heat-exchange efficiency can be improved.

Gaps between the inner circumference of the heat transfer medium circulation tube 15 and the outer wall of the reaction vessel 13 are filled with a filler 22 for efficiently transferring heat from the heat transfer medium circulation tube 15 to the outer wall of the reaction vessel 13. This filler 22 is for cancelling decrease in heat transfer by a gas such as air or nitrogen gas which is enclosed in the gaps. By filling the fillerheat transfer medium 22 composed of a material having the same thermal conductivity as or a higher thermal conductivity than that of materials of the heat transfer medium circulation tube 15 and the reaction vessel 13, such as copper, aluminum, brass, stainless steel, sintered metal, or thermal transfer cement, the efficiency of heat transfer between the heat transfer medium circulation tube 15 and the reaction vessel 13 can be improved. By using, as the filler 22, a material inside which a liquid can flow, such as copper wool, aluminum wool, brass wool, stainless steel wool or sintered metal, scattering of liquid nitrogen discharged from the orifice 15b can be prevented, and at the same time, the flow time of liquid nitrogen flowing along the outer wall of the reaction vessel 13 can be prolonged, thereby further improving the heat exchange efficiency.

The pressing member 16 for pressing the heat transfer medium circulation tube 15 against the outer wall of the reaction vessel 13 is a strip-shaped plate, wherein the upper end of the pressing member 16 is fixed on the outer wall of the reaction vessel 13 at above the wound portion 15a of the heat transfer medium circulation tube 15, and the lower end of the pressing member 16 is fixed on the outer wall of the reaction vessel 13 at below the wound portion 15a (on the center side of the bottom), by attachment screws 16a, 16a, respectively. Four pressing members 16 are attached at regular intervals in the circumferential direction of the reaction vessel 13, and press the inner circumference portion of the wound portion 15a against the outer periphery of the outer wall of the reaction vessel 13 in such a manner that they are surely in contact with each other.

When a low-temperature reaction is performed by using the thus formed reaction device 11, the reaction liquid 12 is contained in the reaction vessel 13, and while the reaction liquid 12 is agitated with the agitator 20, liquid nitrogen is provided in the heat transfer medium circulation tube 15. Consequently, a direct heat exchange is performed at the contact portion between the wound portion 15a having a low temperature by cooling with liquid nitrogen and the reaction vessel 13, and further, an indirect heat exchange with the reaction vessel 13 is performed via the filler 22 having a low temperature by the contact with the wound portion 15a, whereby the reaction liquid 12 in the reaction vessel 13 is cooled to a prescribed temperature.

The feed amount of liquid nitrogen into the heat transfer medium circulation tube 15 is controlled by opening and closing a valve provided on the heat transfer medium circulation tube 15 based on the temperature of the reaction liquid 12 in the reaction vessel 13 measured by a temperature sensor, or by adjusting the degree of opening of the valve or the like. Liquid nitrogen or vaporized nitrogen gas risen up in the wound portion 15a is discharged from the orifice 15b toward the outer wall of the reaction vessel 13, and after cooling the space between the reaction vessel 13 and the outer vessel 14, lead out from a discharge port (not shown) provided on the outer vessel 14 to the outside.

Since the amount of liquid nitrogen used for cooling the reaction liquid 12 can be at most the amount by which the orifice 15b provided at the end portion of the heat transfer medium circulation tube 15 is filled, which is considerably smaller than the amount of liquid nitrogen left in a jacket in a conventional jacket type device, the amount of liquid nitrogen required for the initial cooling can be considerably made small, and at the same time, the occurrence of undershoot with respect to the set temperature can be prevented because the amount of liquid nitrogen left in the heat transfer medium circulation tube 15 is small by stopping the provision of liquid nitrogen at the time when the reaction liquid 12 is cooled to a set temperature. Since liquid nitrogen can be provided in the smaller volume heat transfer medium circulation tube 15 compared with a jacket type device while cooling near the set temperature, the amount of liquid nitrogen used can be made small, and at the same time, since the feed amount of liquid nitrogen can be easily optimized, the temperature control precision can be improved.

Further, by spirally winding the heat transfer medium circulation tube 15 on the outer circumference of the reaction vessel 13, the wound portion 15a can be enough long, and the residence time of liquid nitrogen in the wound portion 15a can be prolonged, whereby liquid nitrogen provided in the wound portion 15a can efficiently contribute to heat exchange. Since, by providing the outer vessel 14 which hermetically covers the outer circumference of the reaction vessel 13, the temperature of the space between the reaction vessel 13 and the outer vessel 14 can be kept lower than the temperature of the atmosphere where the reaction device 11 is installed, the cooling effect by the heat transfer medium circulation tube 15 can be further improved.

Figure 8:
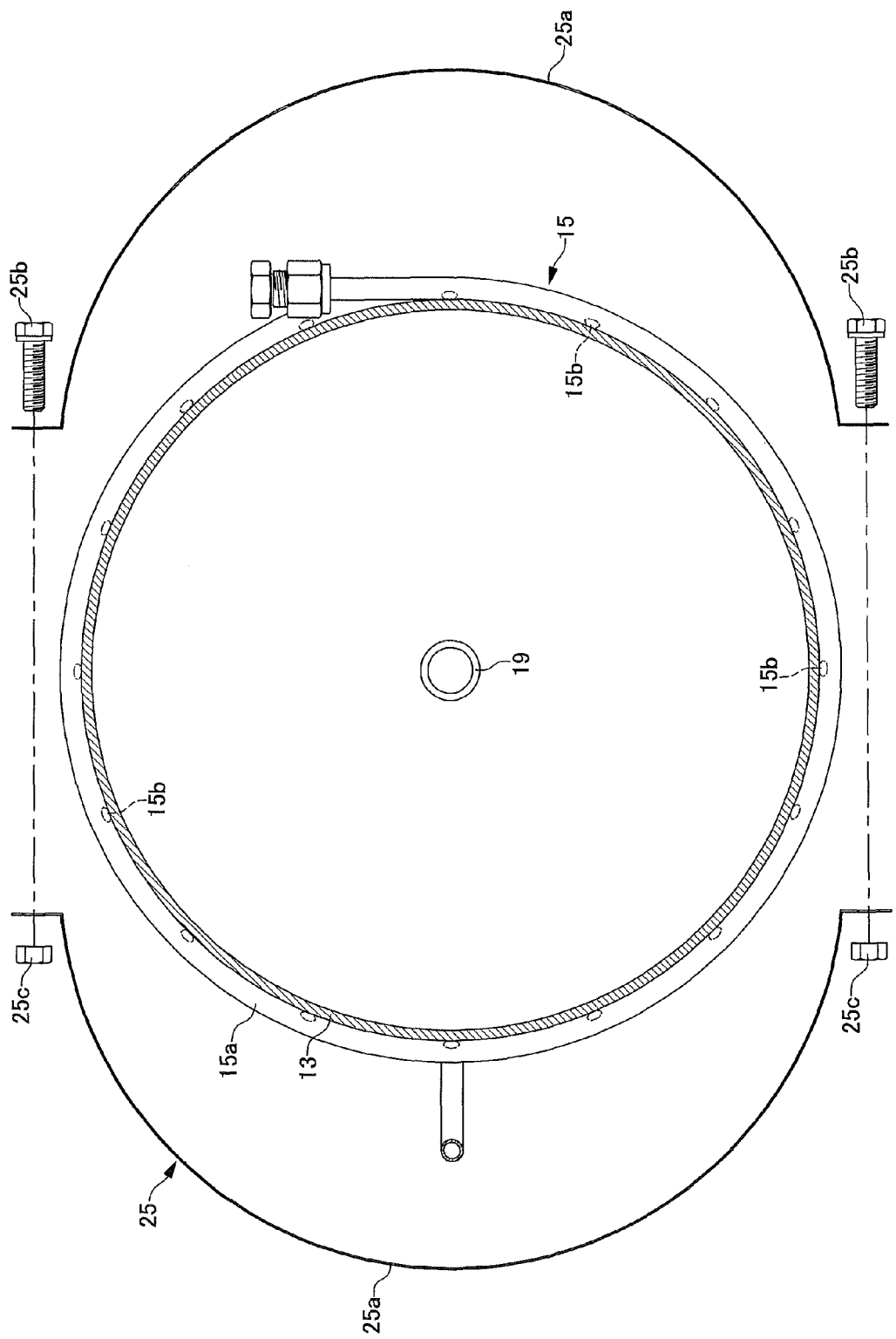
FIG. 8 is a cross-sectional view of a reaction vessel representing the second embodiment of the present invention.

FIG. 8 represents the second embodiment of the present invention, and the same component as in the first embodiment is denoted as the same sign, and the description thereof in detail will be left out.

In the present embodiment, as the pressing member which presses the wound portion 15a of the heat transfer medium circulation tube 15 against the outer wall of the reaction vessel 13, a pair of half bodies 25a, 25a having a shape such that a cylindrical pressing plate 25 which covers the periphery of the wound portion 15a is divided into two parts in a vertical plane are used, and by fastening the end portions of the half bodies 25a, 25a together by a plurality of bolts 25b and nuts 25c, the wound portion 15a is in close contact with the outer wall of the reaction vessel 13.

By pressing the heat transfer medium circulation tube 15 against the reaction vessel 13 by such a pressing plate 25, the efficiency of heat transfer between the heat transfer medium circulation tube 15 and the filler 22 and the outer wall of the reaction vessel 13 can be further improved, and at the same time, the cooling effect by liquid nitrogen flowing inside the filler 22 can be further improved.

Figure 9:
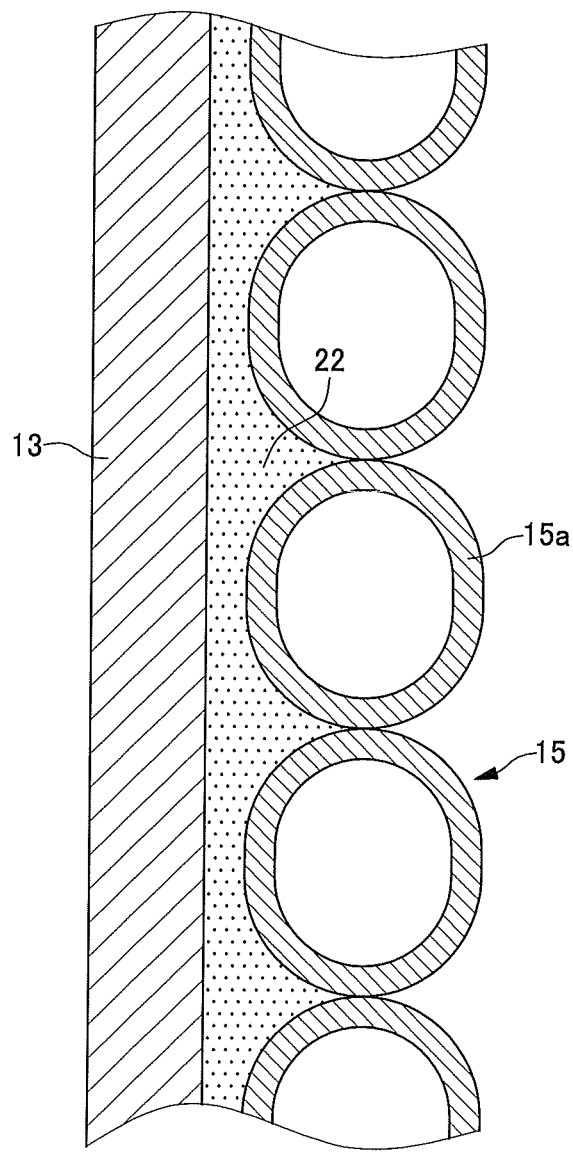
FIG. 9 is a cross-sectional view of a reaction vessel representing the main portion of the third embodiment of the present invention.

FIG. 9 represents the third embodiment of the present invention, and the same component as in the first embodiment is denoted as the same sign, and the description thereof in detail will be left out.

By winding a sheet-shaped filler 22 on the outer wall of a reaction vessel which contains a reaction liquid and providing a heat transfer medium circulation tube in such a state that the tube presses over the sheet, gaps between the heat transfer medium circulation tube and the outer wall of the reaction vessel are filled with a filler. Also in cases where the heat transfer medium circulation tube and the outer wall of the reaction vessel are in contact with each other via the sheet-shaped filler of a material inside which a liquid can flow, they are substantially in a state of being in contact with each other, and a cooling effect by liquid nitrogen can be obtained in the same manner as in the first embodiment.

As the sheet-shaped filler, a material having the same thermal conductivity as or a higher thermal conductivity than that of materials of the heat transfer medium circulation tube 15 and the reaction vessel 13 and a structure inside which a liquid can flow, such as copper wool, aluminum wool, brass wool, stainless steel wool or sintered metal can be used. A sheet with a thickness of ±30% to ±10% with respect to the diameter of the heat transfer medium circulation tube (diameter with respect to the diameter direction of the reaction vessel) in the state before it is pressed by the heat transfer medium circulation tube, is preferably used. By pressing the heat transfer medium circulation tube thereon, the thickness of the sheet is compressed to about 20% compared with the thickness of the sheet before it is pressed.

Although in the above-mentioned embodiments, as a heat transfer mediumheat transfer medium, liquid nitrogen is used, the heat transfer medium is not limited thereto in the present invention. Any heat transfer mediumheat transfer medium may be used, and a heat transfer medium which increases the temperature of the reaction liquid may be used. A plurality of heat transfer medium circulation tubes can be used, and also, the heat transfer medium circulation tubes can be provided in a zigzag-shape on the outer wall of the reaction vessel. Further, a device in which a heat transfer medium introduction port is provided on the lower portion of the outer vessel, and a heat transfer medium discharge port is provided on the top the outer vessel individually, and which has a structure in which a heat transfer medium can be directly introduced in the outer vessel in the same way as in a conventional device may be used.

Example 1

In the reaction device shown in FIG. 1, as the reaction vessel 11, a general 10 liter reaction vessel (diameter: about 215 mm, depth: about 250 mm) was used to perform a cooling experiment. As the heat transfer medium circulation tube 15, a commercially available copper pipe was used, and gaps between the copper pipe and the reaction vessel outer wall was filled with a commercially available copper wool. As the outer vessel 14, a jacket (outer vessel) which is used for a conventional jacket type 10 liter reaction vessel was used as it was.

Experimental Example 1

On the outer circumference of the reaction vessel, a 22 m copper pipe having a diameter of 9.53 mm was wound, and the temperature of a reaction liquid was set to −90° C. to provide liquefied nitrogen to the copper pipe.

Experimental Example 2

On the outer circumference of the reaction vessel, a 34 m copper pipe having a diameter of 6.35 mm was wound, and, in the same manner as in Experimental Example 1, the temperature of a reaction liquid was set to −90° C. to provide liquefied nitrogen to the copper pipe.

Experimental Example 3

On the outer circumference of the reaction vessel, a 17 m copper pipe having a diameter of 6.35 mm was wound on the lower half of the reaction vessel, and, in the same manner as in Experimental Example 1, the temperature of a reaction liquid was set to −90° C. to provide liquefied nitrogen to the copper pipe.

Experimental Example 4

As a comparative example, the same device was used as a jacket type device without winding a copper pipe, and, in the same manner as in Experimental Example 1, the temperature of a reaction liquid was set to −90° C. to provide liquefied nitrogen to the jacket.

An initial cooling time (0 to −90° C. (min)), a control precision (ΔT° C.), the amount of liquefied nitrogen used at the initial cooling (kg) in Experimental Examples 1 to 4, are shown in Table 1.

TABLE 1

|  | Initial cooling time (min) (0 to −90° C.) | Control precision (° C.) (ΔT) | Amount of liquefied nitrogen used (kg) (Initial cooling) |
| --- | --- | --- | --- |
| Experimental Example 1 | 26.8 | 1.4 | 10.4 |
| Experimental Example 2 | 51.9 | 0.9 | 11.1 |
| Experimental Example 3 | 43.5 | 0.9 | 11.2 |
| Experimental Example 4 | 32.6 | 3.7 | 15.7 |

In Experimental Example 1, although the initial cooling time was the shortest, and the amount of liquefied nitrogen used was the smallest, the control precision was slightly worse than that in Experimental Example 2 and Experimental Example 3. In Experimental Example 2 and Experimental Example 3, although the initial cooling time and the amount of liquefied nitrogen used were worse than that in Experimental Example 1, an excellent control precision could be obtained. The initial cooling time in Experimental Example 2 is longer than that in Experimental Example 3 because the resistance in the flow pass is increased because the pipe is long, or because the provision times of liquefied nitrogen to the whole pipes are not the same. In Experimental Example 3, the amount of liquefied nitrogen used is slightly larger than that in Experimental Example 2, because the amount of liquefied nitrogen which does not contribute to the heat exchange and discharged is slightly increased because the pipe is short. However, it is found that in any of these Experimental Examples, the control precision and the amount of liquefied nitrogen used are considerably improved compared with Experimental Example 4 which uses a conventional jacket type device.

REFERENCE SIGNS LIST

11 ... reaction device, 12 ... reaction liquid, 13 ... reaction vessel, 13a ... reaction vessel flange, 14 ... outer vessel, 14a ... cylindrical portion, 15 ... heat transfer medium circulation tube, 15a wound portion, 15b ... orifice, 16 ... pressing member, 16a ... attachment screws, 17 ... bolt, 18 ... lid member, 19 ... discharge tube, 20 ... agitation blade, 20a ... motor, 20b ... rotation axis, 20c ... agitation blade, 21 ... cap, 22 ... filler, 25 ... pressing plate, 25a ... half body, 25b ... bolt, 25c ... nut

The invention claimed is:

1. A reaction device comprising:
a heat transfer medium circulation tube in contact with an outer wall of a reaction vessel containing a reaction liquid;
an inlet for liquid medium formed at a lower end portion of the heat transfer medium circulation tube; and
an outlet for the liquid medium or a gas heat medium, which is a vaporized liquid heat medium, formed at an upper end portion of the heat transfer medium circulation tube; and
a filler filling gaps formed between the heat transfer medium circulation tube and the reaction vessel outer wall, wherein the filler is formed by a material in which a liquid can flow inside the filler, and at the same time, the outlet is formed in a direction such that the liquid medium or a resulting gas medium is discharged toward the filler.

2. The reaction device according to claim 1, wherein the heat transfer medium circulation tube is wound spirally from a bottom side of the reaction vessel to a top side the of reaction vessel.

3. The reaction device according to claim 2, wherein a pressing member for pressing the heat transfer medium circulation tube against the outer wall of the reaction vessel is provided on an outer circumference of the heat-medium circulation tube.

4. The reaction device according to claim 2, wherein an outer vessel is provided which hermetically covers an outer circumference of the reaction vessel provided with the heat transfer medium circulation tube.

5. The reaction device according to claim 2, wherein the heat transfer medium is liquid nitrogen.

6. The reaction device according to claim 1, wherein a pressing member for pressing the heat transfer medium circulation tube against the outer wall of the reaction vessel is provided on an outer circumference of the heat-medium circulation tube.

7. The reaction device according to claim 6, wherein an outer vessel is provided which hermetically covers the outer circumference of the reaction vessel provided with the heat transfer medium circulation tube.

8. The reaction device according to claim 1, wherein an outer vessel is provided which hermetically covers an outer circumference of the reaction vessel provided with the heat transfer medium circulation tube.

9. The reaction device according to claim 1, wherein the liquid heat transfer medium is liquid nitrogen.

10. The reaction device according to claim 1, wherein a pressing member for pressing the heat transfer medium circulation tube against the outer wall of the reaction vessel is provided on an outer circumference of the heat transfer medium circulation tube.

11. The reaction device according to claim 1, wherein an outer vessel is provided which hermetically covers an outer circumference of the reaction vessel provided with the heat transfer medium circulation tube.

12. A reaction device comprising: which is provided with a heat transfer medium circulation tube on an outer wall of a reaction vessel containing a reaction liquid, and a filler in gaps between the heat-medium circulation tube and the outer wall, wherein the heat transfer medium circulation tube defines an inlet for liquid heat medium at a lower end portion of the heat transfer medium circulation tube, and an outlet for the liquid heat medium or a gas heat medium which is a vaporized liquid heat medium at an upper end portion of the heat transfer medium circulation tube, wherein the filler is formed by a material in which a liquid can flow inside the filler, and at the same time, the outlet is formed in a direction such that the liquid medium or a resulting gas medium is discharged toward the filler.

13. A reaction device comprising:
a reaction vessel having an outer wall defining an interior for containing a reaction liquid;

a heat transfer medium circulation tube coupled to the outer wall of the reaction vessel defining an inlet for fluid heat medium and at least one outlet for the fluid heat medium; and filler in gaps formed between the heat transfer medium circulation tube and the reaction vessel outer wall, wherein the at least one outlet discharges the fluid heat medium toward the filler.

14. The reaction device according to claim 13, wherein the filler is a material in which fluid can flow.

15. The reaction device according to claim 13, wherein the heat transfer medium circulation tube is spirally wound about the reaction vessel.

16. The reaction device according to claim 15, wherein the outlet is a plurality of outlets equally spaced about a circumference of the outer wall.

17. The reaction device according to claim 13, further comprising a pressing member for pressing the heat transfer medium circulation tube against the outer wall of the reaction vessel.

18. The reaction device according to claim 17, wherein the heat transfer medium circulation tube presses over the filler causing compression of the filler.

19. The reaction device according to claim 13, wherein the filler is sheet-shaped and wrapped around the outer wall.

\* \* \* \* \*